US012676569B2

(12) United States Patent
Secrest et al.

(10) Patent No.: US 12,676,569 B2
(45) Date of Patent: Jul. 7, 2026

(54) CONTROL SYSTEM FOR DYNAMIC CURRENT LIMITS ON A ROTATING ELECTRICAL MACHINE

(71) Applicant: BorgWarner Inc., Auburn Hills, MI (US)

(72) Inventors: Caleb Wayne Secrest, Noblesville, IN (US); Siddharth Ballal, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 82 days.

(21) Appl. No.: 18/227,408

(22) Filed: Jul. 28, 2023

(65) Prior Publication Data

US 2025/0038694 A1    Jan. 30, 2025

(51) Int. Cl.
| | |
|---|---|
| *H02P 9/02* | (2006.01) |
| *B60L 15/20* | (2006.01) |
| *H02P 25/04* | (2006.01) |
| *H02P 29/032* | (2016.01) |
| *H02P 29/64* | (2016.01) |
| *H02P 29/66* | (2016.01) |
| *H02P 29/68* | (2016.01) |

(52) U.S. Cl.
CPC ........... *H02P 29/032* (2016.02); *B60L 15/20* (2013.01); *H02P 29/64* (2016.02); *H02P 29/662* (2016.11); *H02P 29/68* (2016.02);

*B60L 2240/423* (2013.01); *B60L 2240/425* (2013.01); *B60L 2240/427* (2013.01); *B60L 2240/429* (2013.01)

(58) Field of Classification Search
CPC .... H02P 6/08; H02P 6/10; H02P 21/12; H02P 25/022; H02P 27/085; H02P 29/40; H02P 29/60; H02P 21/00; H02P 21/10
See application file for complete search history.

(56) References Cited

U.S. PATENT DOCUMENTS

| | | | | |
|---|---|---|---|---|
| 12,134,452 | B1 * | 11/2024 | Kalnins | .................. H02P 23/20 |
| 2009/0072770 | A1 * | 3/2009 | Son | ......................... H02P 29/68 |
| | | | | 180/65.8 |
| 2015/0236632 | A1 * | 8/2015 | Marohl | ................. H02P 29/662 |
| | | | | 318/722 |
| 2020/0321903 | A1 * | 10/2020 | Harada | ................. H02P 29/032 |
| 2021/0313924 | A1 * | 10/2021 | Yoo | ........................ H02M 7/537 |

* cited by examiner

*Primary Examiner* — Kawing Chan
*Assistant Examiner* — Charles S Laughlin
(74) *Attorney, Agent, or Firm* — Reising Ethington P.C.

(57) ABSTRACT

A control system for generating a modified torque command for a rotating electrical machine in a battery electric vehicle (BEV) includes a microprocessor, capable of reading executable commands stored in non-volatile memory, configured to electrically connect to an inverter, determine a rated maximum current of the rotating electrical machine, receive sensor input indicating a temperature or estimating the temperature of at least one portion of the BEV, output a modified maximum current based on the received sensor input, and generate a torque command to the rotating electrical machine based on the modified maximum current.

18 Claims, 3 Drawing Sheets

CONTROL SYSTEM FOR DYNAMIC CURRENT LIMITS ON A ROTATING ELECTRICAL MACHINE

TECHNICAL FIELD

The present application relates to control systems and, more particularly, to control systems for electric machines.

BACKGROUND

Vehicles are increasingly propelled by at least one rotating electrical machine (also sometimes referred to as an electric motor). The use of rotating electrical machines involves control systems that regulate the supply of DC voltage from a vehicle battery to the rotating electrical machine. As more and more vehicles use rotating electrical machines, the control systems used with these machines can more efficiently and optimally regulate a supply of AC current to the machine.

SUMMARY

In one implementation, a control system for generating a modified torque command for a rotating electrical machine in a battery electric vehicle (BEV) includes a microprocessor, capable of reading executable commands stored in non-volatile memory, configured to electrically connect to an inverter, determine a rated maximum current of the rotating electrical machine, receive sensor input indicating a temperature or estimate the temperature of at least one portion of the BEV, output a modified maximum current based on the received sensor input, and generate a torque command to the rotating electrical machine based on the modified maximum current.

In another implementation, a control system for generating a modified torque command for a rotating electrical machine in a BEV, includes a microprocessor, capable of reading executable commands stored in non-volatile memory, configured to electrically connect to an inverter, including a power loss modeling block that determines at least one power loss of the rotating electrical machine, a thermal modeling block that monitors at least one temperature at the BEV, and a maximum phase determination block that determines a rated maximum current of the rotating electrical machine and modifies the rated maximum current to generate a modified maximum current, used to generate a torque command to the rotating electrical machine.

In yet another implementation, a method of generating a modified torque command for a rotating electrical machine in a BEV includes the steps of: determining a rated maximum current of the rotating electrical machine; receiving sensor input indicating a temperature or estimating the temperature of at least one portion of the BEV; outputting a modified maximum current based on the received sensor input; and generating a torque command to the rotating electrical machine based on the modified maximum current.

DETAILED DESCRIPTION

Figures 1, 2:
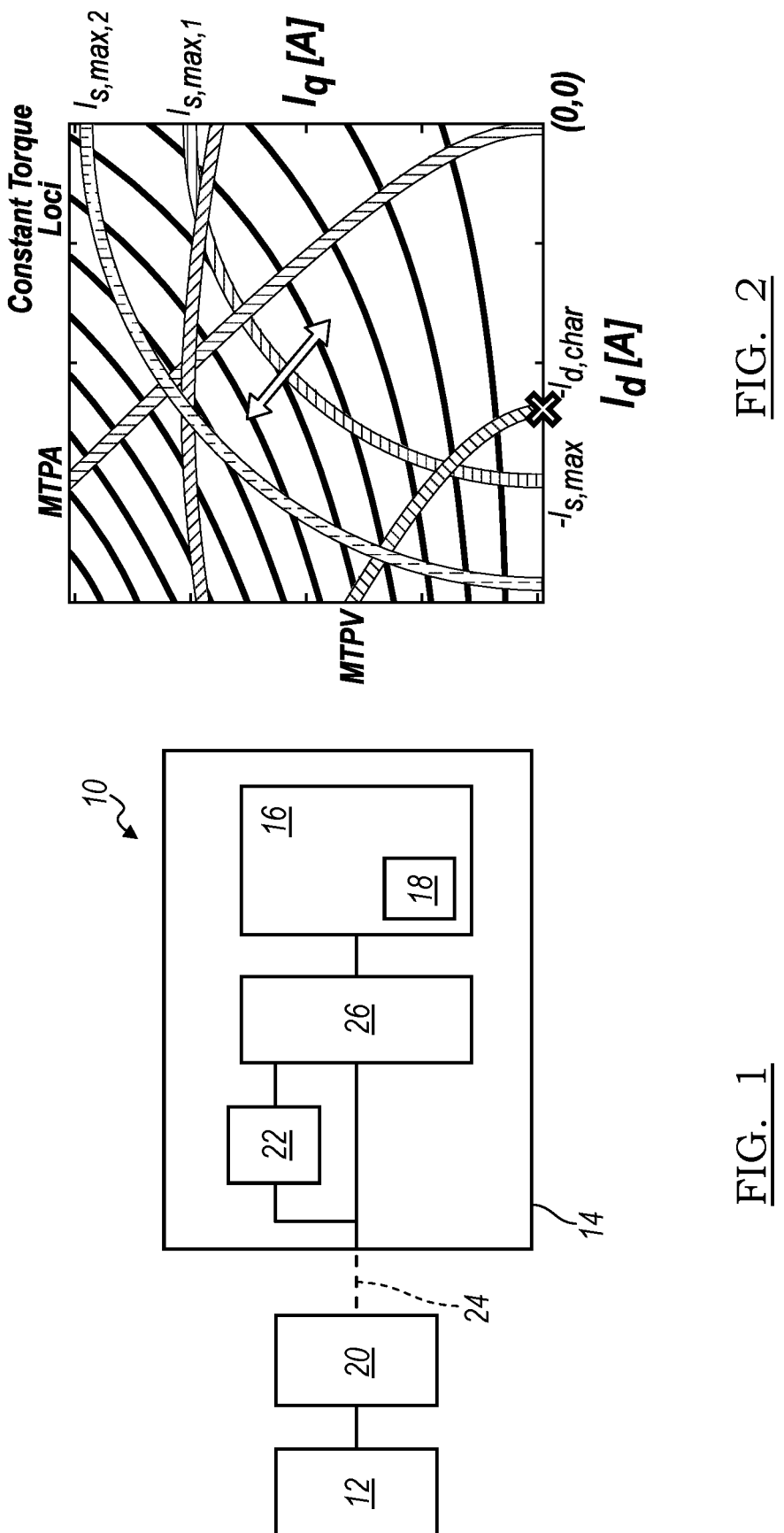
FIG. 1 is a block diagram depicting an implementation of a battery electric vehicle (BEV) having a control system.
FIG. 2 is a graph depicting an implementation of a current plane used by the control system.

A control system regulates the supply of electrical power to an electric machine (also called an electric motor) of a battery electric vehicle (BEV). As part of this regulation, the control system is programmed with a number of constraints or limitations that prevent the system from over taxing the electric drive system. That is, the electric drive system can have a rated capability beyond which the torque commands issued by the control system shall not exceed. For instance, the rated capability of the motor can be defined by variables such as a maximum torque per ampere (MTPA), a maximum torque per volt (MTPV), an inverter voltage limit, and a maximum current ($I_{s,\,max}$). Depending on these variables, the electric drive system can output a limited amount of torque at the output shaft. In some implementations, the rated capability of the electric motor can be specified by the intersection of $I_{s,\,max}$ and the MTPA. $I_{s,\,max}$ typically reflects the maximum sustained or continuous operating current of the electric drive system. An implementation of this relationship is shown in FIG. 2. The rated maximum current value ($I_{s,\,max,\,1}$) can be determined based on the thermal capabilities of the electric drive system and its cooling system given a particular coolant temperature and flow rate. However, for limited periods of time, the electric drive system may be capable of current levels above the rated maximum current thereby increasing the torque or power of the electric drive system. The control system can monitor various operating variables of the electric motor and/or the BEV and determine a modified maximum current ($I_{s,\,max,\,2}$) and a duration for operating at the modified maximum current. The control system can generate a torque command for the electric drive system, receive inputs from the electric motor and the BEV, determine the modified maximum current, and generate a different torque command based on the modified maximum current ($I_{s,\,max,\,2}$). The control system can also set a duration for generating the different torque command after which the control system can return to using the rated maximum current ($I_{s,\,max,\,1}$).

Turning to FIG. 1, an implementation of an electrical system 10 is shown. The system 10 includes an electrical grid 12 and a battery electric vehicle (BEV) 14 that can receive electrical power from the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or a business.

The BEV 14 includes one or more rotating electrical machines 16 (also referred to as electric motors) that include a stator having stator windings and a rotor that can be angularly displaced relative to the stator (not shown). In one implementation, the rotating electrical machine 16 (also referred to as an electric motor) is a permanent magnet synchronous electrical machine, which includes a rotor having a plurality of angularly-spaced permanent magnets. The permanent magnets can be made from any one of a number of different materials, one example of which is a neodymium alloy or other rare earth element. As noted above, the stator windings can receive electrical current the supply of which can be regulated by a control system 18 that induces the angular displacement of the rotor relative to the stator. The control system 18 can include an array of power control electronics and microprocessors that facilitate the operation of the rotating electrical machine 16. These electronics may include an inverter implemented using a plurality of MOSFETs that switch on and off according to a choreographed order and timing at the direction of a motor controller to induce rotor angular movement. The control system 18 can output current commands that regulate the electrical current supplied to the rotating electrical machine 16. The current commands can be divided into quadrature ($I_q$) and direct ($I_d$) current commands as part of a field-oriented control system. The motor controller can be implemented using one or more microprocessors having input/output and non-volatile memory where data can be stored and accessed. In addition to the inverter, the control system 18 can include a DC-DC converter to regulate voltage levels of electrical power supplied to the electrical machine 16. The control system 18 can also include one or more thermistors used to determine the ambient temperature and the temperature of the rotating electrical machine 16.

BEV service equipment 20, also referred to as a BEV charging station, can receive AC electrical power from the grid 12 and provide the electrical power to the BEV 14. The BEV service equipment 20 can include an input terminal that receives the AC electrical power from the grid 12 and communicates the AC electrical power to an on-board vehicle battery charger included on the BEV 14. The on-board vehicle battery charger 22 can include an AC/DC inverter so that the AC electrical power received from the grid 12 can be supplied to a vehicle battery 26. An electrical cable 24 can detachably connect with an electrical receptacle on the BEV 14 and electrically link a BEV charging station with the BEV 14 so that AC electrical power can be communicated between the charging station and the BEV 14. The BEV charging station can be classified as "Level 2" BEV service equipment that receives 240 VAC from the grid 12 and supplies 240 VAC to the BEV 14. It is possible the level of AC electrical power input to a charging station and/or the level of AC electrical power output from a charging station is different in other implementations.

The term "battery electric vehicle" or "BEV" can refer to vehicles that are propelled, either wholly or partially, by rotating electrical machines or motors. BEV can refer to electric vehicles, plug-in electric vehicles, hybrid-electric vehicles, and battery powered vehicles. The vehicle battery 26 can supply DC electrical power, that has been converted from AC electrical power, to the electrical machine(s) 16 that propel the BEV. As noted above, the control system 18 can convert the DC electrical power into AC electrical power to induce angular movement of the rotor relative to the stator. The vehicle battery 26 or batteries are rechargeable and can include lead-acid, nickel cadmium (NiCd), nickel metal hydride, lithium-ion, and lithium polymer batteries, to name a few. A typical BEV battery voltage is 200 to 800 VDC. The term "electric drive system" can include not only the electric motor but also the inverter, the vehicle battery, and other electrical components of the BEV.

Figure 3:
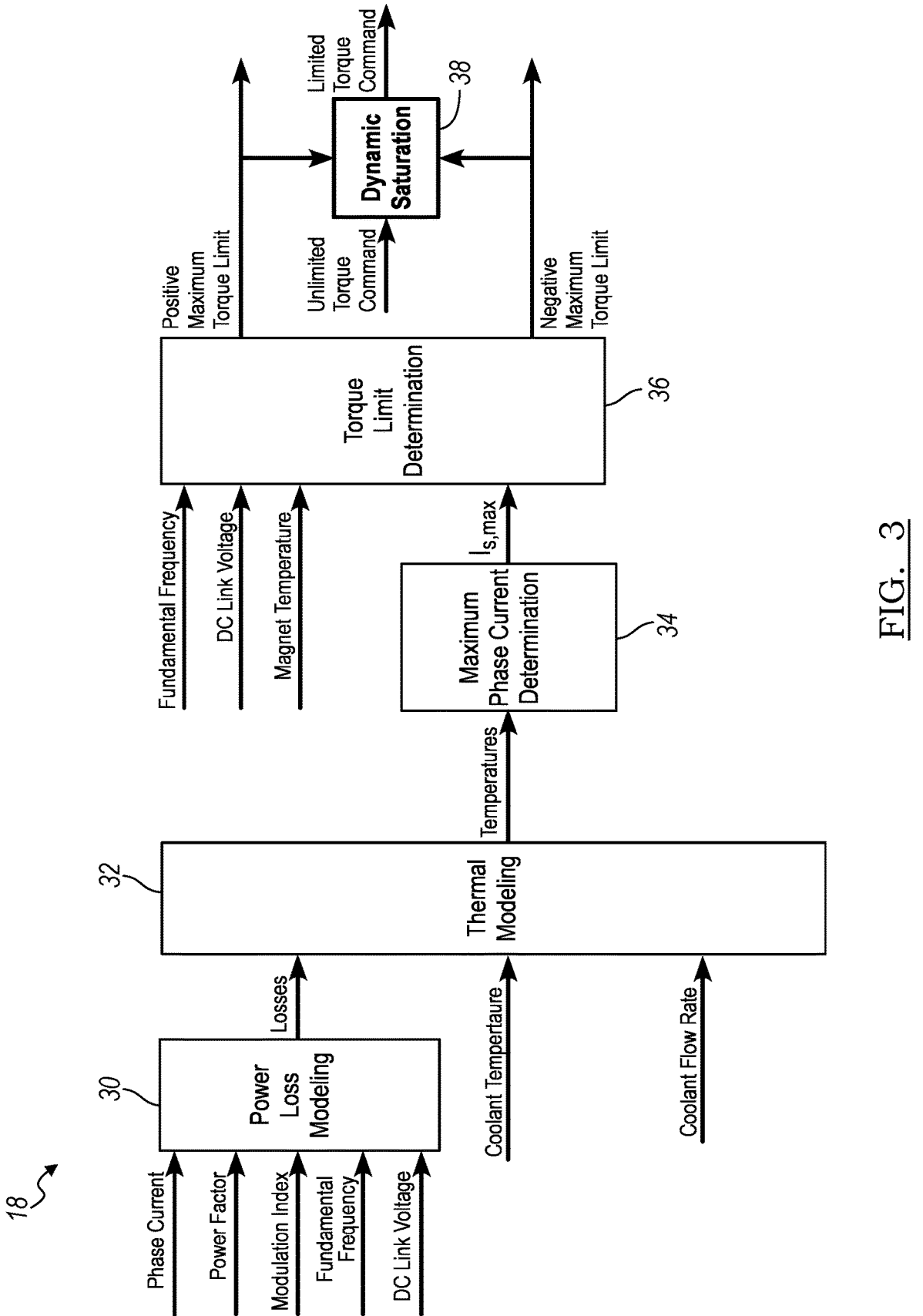
FIG. 3 is a block diagram depicting an implementation of a control system.

An implementation of the control system 18 is shown in FIG. 3. The control system 18 includes a power loss modeling block 30, a thermal modeling block 32, a maximum phase current determination block 34, a torque limit determination block 36, and a dynamic saturation block 38. The power loss modeling block 30 receives inputs from sensors that monitor the BEV 14 and estimates the losses of the thermally critical components. The inputs include the phase current, the power factor, the modulation index, the fundamental frequency, and the DC link voltage. The control system 18 can use these inputs to determine system loss, such as conduction losses, switching losses, core losses, capacitor and battery equivalent series resistance (ESR) losses to name a few. The thermal modeling block 32 can receive the determined losses from the power loss modeling block 30 as well as data indicating the coolant temperature and coolant flow rate of the BEV 14. Based on the input, the thermal modeling block 32 can generate temperature values for the BEV 14 during operation. The temperature values can reflect the temperatures of the stator of the rotating electrical machine 16, the rotor of the rotating electrical machine 16, the bulk capacitance, the power semiconductors, and/or the bus bars to provide a few examples.

Figure 4:
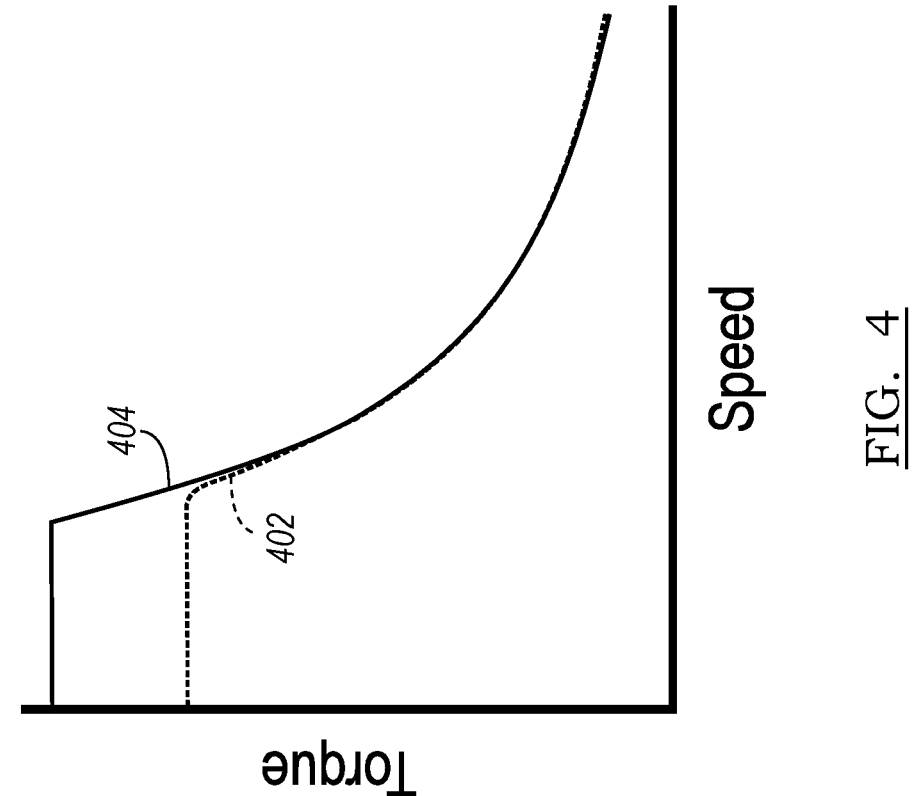
FIG. 4 is a graph depicting a maximum available torque of the rotating electrical machine.

The hotspot temperatures from the thermal modeling block 32 can be provided to the maximum phase current determination block 34. The maximum phase current determination block 34 can use the temperatures to dynamically determine a modified maximum current value that is independent of the continuous rating of the rotating electrical machine 16. In one implementation, a look-up table can be stored in memory at the control system 18 that includes various temperature inputs and corresponding restrictive temperature/current combinations associated with the inputs. The modified maximum current value can be provided to the torque limit determination block 36. The torque limit determination block 36 can also receive values for the fundamental frequency, the DC link voltage, and the magnet temperature of the rotor to calculate a positive maximum torque limit, and a negative maximum torque limit. The positive maximum torque limit and negative maximum torque limit determined at the torque limit determination block 36 can then be supplied to the dynamic saturation block 38 along with an unlimited torque command. The dynamic saturation block 38 can generate a different or limited torque command based on the calculated positive maximum torque limit and negative torque limit. The control system 18 can repeat this process during operation to modify the torque command as conditions change. A graph of maximum positive torque limits as a function of angular velocity of the output shaft of the rotating electric machine 16 is shown in FIG. 4. A first curve 402 indicates the torque limit based on the rated maximum current value and a second curve 404 indicates a torque limit based on the modified maximum current value.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

What is claimed is:

1. A control system for generating a modified torque command for a rotating electrical machine in a battery electric vehicle (BEV), comprising:

a microprocessor, capable of reading executable commands stored in non-volatile memory, configured to electrically connect to an inverter, determine a rated maximum current of the rotating electrical machine, receive sensor input indicating a temperature or estimating the temperature of at least one portion of the BEV, output a modified maximum current that exceeds a rated maximum current and a duration for operating at the modified maximum current based on the received sensor input indicating the temperature or the estimated temperature, and generate a torque command to the rotating electrical machine based on the modified maximum current.

2. The control system recited in claim 1, wherein the microprocessor determines at least one power loss of the BEV.

3. The control system recited in claim 1, wherein the microprocessor determines a temperature of a stator winding, a temperature of a rotor, a temperature of a bulk capacitor, a temperature of a power semiconductor, or a temperature of a bus bar.

4. The control system recited in claim 1, wherein the sensor input includes coolant temperature or coolant flow rate.

5. The control system recited in claim 1, wherein the rated maximum current of the rotating machine is stored at the BEV in a lookup table.

6. The control system recited in claim 1, wherein the microprocessor determines a rated maximum current of an electric drive system.

7. The control system of claim 1 wherein the memory stores a look-up table that includes temperature inputs and corresponding temperature/current combinations associated with the temperature inputs, wherein the microprocessor determines the modified maximum current values using the look-up table.

8. A control system for generating a modified torque command for a rotating electrical machine in a battery electric vehicle (BEV), comprising:

a microprocessor, capable of reading executable commands stored in non-volatile memory, configured to electrically connect to an inverter, including a power loss modeling block that determines at least one power loss of the rotating electrical machine, a thermal modeling block that monitors at least one temperature at the BEV, and a maximum phase determination block that determines a rated maximum current of the rotating electrical machine and modifies the rated maximum current, based on the at least one temperature, to generate a modified maximum current exceeding a rated maximum current and a duration for operating at the modified maximum current, used to generate a torque command to the rotating electrical machine.

9. The control system recited in claim 8, wherein the microprocessor determines the at least one power loss of the rotating electrical machine based on phase current, power factor, modulation index, fundamental frequency, or DC link voltage.

10. The control system recited in claim 8, wherein the thermal modeling block determines a temperature of a stator winding, a temperature of a rotor, a temperature of a bulk capacitor, a temperature of a power semiconductor, or a temperature of a bus bar.

11. The control system recited in claim 8, wherein the microprocessor receives sensor input including coolant temperature or coolant flow rate.

12. The control system recited in claim 8, wherein the rated maximum current of the rotating machine is stored at the BEV in a lookup table.

13. A method of generating a modified torque command for a rotating electrical machine in a battery electric vehicle (BEV), comprising the steps of:

(a) determining a rated maximum current of the rotating electrical machine;

(b) receiving sensor input indicating a temperature or estimating the temperature of at least one portion of the BEV;

(c) outputting a modified maximum current that exceeds the rated maximum current of the rotating electrical machine and a duration for operating at the modified maximum current based on the received sensor input indicating the temperature or the estimated temperature; and (d) generating a torque command to the rotating electrical machine based on the modified maximum current.

14. The method recited in claim 13, further comprising the step of determining at least one power loss of the BEV.

15. The method recited in claim 13, further comprising the step of determining a temperature of a stator winding, a temperature of a rotor, a temperature of a bulk capacitor, a temperature of a power semiconductor, or a temperature of a bus bar.

16. The method recited in claim 13, wherein the sensor input includes coolant temperature or coolant flow rate.

17. The method recited in claim 13, wherein the rated maximum current of the rotating machine is stored at the BEV in a lookup table.

18. The control system recited in claim 13, further comprising the step of determining a rated maximum current of an electric drive system.

\* \* \* \* \*